US012203623B2

(12) United States Patent
Hasek

(10) Patent No.: US 12,203,623 B2
(45) Date of Patent: Jan. 21, 2025

(54) HEADLIGHT FOR AN AUTOMOBILE AND OPTICAL ELEMENT FOR THE HEADLIGHT

(71) Applicant: HELLA AUTOTECHNIK NOVA S.R.O., Mohelnice (CZ)

(72) Inventor: Michal Hasek, Lostice (CZ)

(73) Assignee: HELLA AUTOTECHNIK NOVA S.R.O., Mohelnice (CZ)

( * ) Notice: Subject to any disclaimer, the term of this patent is extended or adjusted under 35 U.S.C. 154(b) by 0 days.

(21) Appl. No.: 18/678,582

(22) Filed: May 30, 2024

(65) Prior Publication Data

US 2024/0401764 A1 Dec. 5, 2024

(30) Foreign Application Priority Data

May 30, 2023 (EP) .................................... 23176024

(51) Int. Cl.

*B60Q 1/04* (2006.01)
*F21S 41/151* (2018.01)
*F21S 41/20* (2018.01)
*F21S 41/25* (2018.01)
*F21S 41/36* (2018.01)
*F21S 41/63* (2018.01)
*F21S 41/663* (2018.01)

(52) U.S. Cl.

CPC ........... *F21S 41/663* (2018.01); *F21S 41/151* (2018.01); *F21S 41/25* (2018.01); *F21S 41/285* (2018.01); *F21S 41/36* (2018.01); *F21S 41/63* (2018.01)

(58) Field of Classification Search

CPC ........ F21S 41/663; F21S 41/151; F21S 41/25; F21S 41/285; F21S 41/36; F21S 41/63

See application file for complete search history.

(56) References Cited

U.S. PATENT DOCUMENTS

2021/0348735 A1 11/2021 Bak et al.

FOREIGN PATENT DOCUMENTS

| | | | |
|---|---|---|---|
| CN | 212719554 | U | 3/2021 |
| DE | 112019000046 | T5 | 8/2020 |
| EP | 2789901 | A2 | 10/2014 |
| EP | 3982041 | A1 | 4/2022 |
| KR | 20200002483 | A | 1/2020 |

*Primary Examiner* — Elmito Breval

(74) *Attorney, Agent, or Firm* — WARNER NORCROSS + JUDD LLP

(57) ABSTRACT

A headlight for an automobile is provided, the headlight including a projection lens, two reflectors, and two light sources. The first light source is directed towards the first reflector, and the second reflector reflects light from the first reflector towards the projection lens. The headlight further comprises a primary lens located between the second light source and the projection lens. The second light source comprises at least two independently operable sets of sub-sources for creating, together with the primary lens, a high-beam illumination with both the first light source and second light source turned on, and for creating a low-beam illumination comprising a cut-off line for limiting dazzling of oncoming drivers with the first light source turned on and only one of the sets of sub-sources of the second light source turned on.

12 Claims, 5 Drawing Sheets

HEADLIGHT FOR AN AUTOMOBILE AND OPTICAL ELEMENT FOR THE HEADLIGHT

CROSS-REFERENCE TO RELATED APPLICATIONS

The present application claims the benefit of European Patent Application No. 23176024.0, filed May 30, 2023, the disclosure of which is incorporated by reference.

FIELD OF THE INVENTION

The present invention relates to automotive lighting, specifically a headlight having a high-beam function and a cut-off line comprising low-beam function provided by an optical assembly with multiple light sources and reflectors.

BACKGROUND OF THE INVENTION

Automobile headlights generally comprise multiple lighting modules for performing various illumination functions. These modules usually include a high beam module, which a driver can use to illuminate the road far ahead when there is no traffic in front of the driver in either direction, and a low beam module (also called dipped or passing beam module), which drivers use when there is traffic in front of them. The low beam module can provide an asymmetrical light beam, which shines further ahead in the driver's own lane than in the opposite lane, i.e., the light falls farther ahead in the right lane than in the left lane in right-hand traffic.

A known way of providing this asymmetrical beam is to provide a shading element in front of the low beam's light source, lens, or reflector. The shading element blocks a part of the light beam produced by the light source so there is a shaded area on the road corresponding to the shape and position of the shading element. The element is said to provide a cut-off line or asymmetrical cut-off line, i.e., the boundary between illuminated and shaded area is closer to the vehicle on one side of the road than on the other. An example of headlight with such a low beam module is disclosed in document JP2003168307A.

Document WO2023277071 A1 describes a vehicle lamp which comprises a high-beam light source and a low-beam light source. The light from the low-beam source is directed towards a first reflector, then to a second reflector and then to a projection lens which directs the light towards the road ahead. The light from the high-beam source is emitted directly to the projection lens, which is shaped such that it processes the light according to a desired optical function. A cut-off line in the low-beam light is created by a specially shaped part of the second reflector and a corresponding part of the projection lens which direct the light to create the desired asymmetrical shape of the beam.

Using the shading element however negatively impacts the efficiency of the headlight, since the shaded part of the light from the light source is lost. Both the shading element and the shaped part of the reflector for creating the cut-off line also make it more difficult to adjust the shape of the cut-off line, e.g., to conform with specific customer requirements or legal requirements or when providing headlight for markets with right-handed as well as for markets with left-handed traffic. A whole new reflector or shading element needs to be provided when a different cut-off line shape is required. Using the shaped part of the reflector for creating the cut-off line also increases complexity of the projection lens.

Providing an alternative way of providing a low beam cut-off pattern would therefore be advantageous.

SUMMARY OF THE INVENTION

The shortcomings of the solutions known in the prior art are to some extent eliminated by a headlight for an automobile comprising a projection lens, a first reflector, a first light source directed towards the first reflector, and a second reflector for reflecting light from the first light source reflected by the first reflector towards the projection lens. In other words, when the first light source is on, it illuminates the first reflector which reflects the light to the second reflector which in turn reflects the light to the projection lens. The projection lens can then direct the light to the road ahead. The headlight further comprises a second light source directed towards the projection lens and comprises a primary lens located between the second light source and the projection lens. The primary lens is located higher than one of the first reflector and second reflector and lower than the other of the first reflector and second reflector, i.e., the primary lens' vertical position is between the two reflectors, it can especially be between them when viewed from the front. The second light source comprises at least two independently operable sets of sub-sources for creating a high-beam illumination with both the first light source and second light source turned on, and for creating a low-beam illumination comprising a cut-off line for limiting dazzling of oncoming drivers with the first light source turned on and only one of the sets of sub-sources of the second light source turned on.

The primary lens thus also serves for directing light for providing the low-beam light with the cut-off line and the high-beam light without the cut-off line, since the light from the second light source passes through the primary lens on its way towards the projection lens. E.g., the lens can increase homogeneity, such that individual sub-sources are less discernable in the beam of light and/or such that the beam of light has an appropriate shape for illumination, e.g., given by norms or legislation.

For the high-beam function, both the sets of sub-sources are thus turned on, while for the low-beam, only one of them is on—this difference in illumination creates the desired cut-off line in the low-beam, and illuminates the road farther ahead in the high-beam. The shape of the cut-off line is determined by spatial arrangement of the sub-sources and by selecting which sub-sources belong to which set. The light sources can be arrays of LEDs and each sub-source can then be an individual LED.

The headlight thus comprises two optical assemblies which cooperate to provide the final illumination function-high or low beam, but can otherwise be substantially independent. The first assembly comprises the two reflectors, the first light source and the projection lens. The second assembly comprises the second light source, the primary lens and the projection lens. The projection lens is thus part of both assemblies and projects light from both light sources. Since the primary lens is vertically between the reflectors, the light of the second assembly can cross the light of the first assembly.

The headlight can comprise a control unit configured for controlling the light sources. The control unit can then be configured such that when a low-beam is required, it turns on the first light source and a first set of sub-sources of the second light source, while the second set remains turned off. When a high-beam is required, the control unit then turns on the first light source and both sets of sub-sources of the second light source. The requirement can be e.g., given by the driver, via a control panel of the dashboard; it can also be automatic. The control unit can have individual control over each sub-source or at least some sub-sources such that when changing the shape or position of the cut-off line, e.g., when switching from right-hand traffic to left-hand traffic, only the control unit needs to be reconfigured, no changes to the optical components or hardware parts would be needed. The control unit can be a part of the headlight, but it can also be a part of the automobile, for which the headlight is intended.

The headlight of the invention can provide the following advantages. Since the two reflectors are used for one part of the final illumination function and the primary lens is used for the other part, the first light source can be located offset from the second light source, while the resulting beam from the projection lens remains relatively continuous and homogeneous, i.e., without such an offset. As a result, the light sources are more easily cooled, since their heat is distributed over a larger area. More LEDs can thus be used, or more powerful LED can be used, thermal damage to components can be reduced, less intensive cooling might be required etc. Using the individually controllable sub-sources for creating the cut-off line can be advantageous, because less light and thus less energy is wasted, e.g., when compared to using a shading cut-off line element. It is also easier to change the cut-off line's shape, since it can be done without the need for changing the light source or any optical elements-only a different sub-source control is needed.

Using the primary lens can be advantageous over e.g., using a reflector for creating the cut-off line, because it can provide a more homogeneous light—the primary lens can preprocess the light to make it relatively homogeneous, e.g., to make the individual sub-sources substantially indistinguishable in the light beam between the primary lens and the projection lens. As a result, the projection lens does not have to have a complex geometry for ensuring sufficient homogeneity of the light from the second light source. Simpler and thus cheaper or smaller projection lens can thus be used.

The primary lens can for example be made from a rigid transparent polymer, e.g., polycarbonate or PMMA. It could also be from glass, which is however generally heavier and more expensive. These materials might be better then e.g., using silicone or similar material, because they are structurally stable and thus easier to fix in place.

The primary lens can be located adjacent to the second reflector. This makes it easier to blend the light from both light sources together and can thus increase homogeneity or decrease complexity of the projection lens.

The primary lens can be, alternatively or additionally, fixed to the second reflector. This can simplify mounting of the component and their precise centering. This fixing can be advantageously achieved by making the primary lens and the second reflector from one piece of transparent material. A part of the material which forms the second reflector then comprises a reflective layer. Making multiple optical components from a single piece of material is cheaper, because e.g., only a single molding or pressing process is needed, and it can also simplify assembly of the headlight, since the components don't need to be attached separately.

The reflective layer can e.g., be a reflexive paint or metallic coating. Making the primary lens together with the second reflector removes the necessity for their respective alignment—the two components than can provide a uniform beam of light comprised from both the light from the first light source and from the second light source. The appearance of this beam is then not affected by manufacturing imprecisions, centering tolerances, vibrations etc.

The primary lens, the first reflector and the second reflector can all be from one piece of transparent material. This further improves on the above-mentioned advantages of making multiple components from the same piece of material-easier mounting, lower number of individual parts, easier centering of components etc. Both the reflectors then comprise a reflective layer, e.g., as described above.

The primary lens can be segmented, i.e., contain multiple individually shaped sections, each section corresponding to a sub-source of the second light source. Each section can thus be individually designed, e.g., by a computer simulation, to achieve a desired shaping and directing of light from the respective sub-source. The sections can thus shape the outputted beam of light, increase homogeneity, shape the cut-off line etc.

Each section can comprise a collimating protrusion for processing light from a sub-source of the second light source via total internal reflection. The collimating protrusions thus help couple the light from the sub-sources into the lens to increase homogeneity. Length of the collimating protrusion can be e.g., from 5 mm to 2 cm, any length sufficient for the total internal reflection to occur can be used.

The primary lens can comprise a front surface facing towards the projection lens and a back surface facing towards the second light source. On the front surface and/or the back surface, there can be for each section a protruding part comprising a refractive optical surface. The retractive protruding part can be for example on the front surface, while the back surface comprises the collimating protrusion for each section. One of the surfaces can also in some embodiments be flat. These refractive protruding parts might be too short for the total internal reflection to occur, such that they only bend light when the light enters and/or leaves the lens through the respective surface. Each section can then for example have individually directed convex/concave surface, have individual radius of curvature etc.

The second light source can comprise at least two rows of LEDs. This improves the adjustability of the low-beam and high-beam functions. For example, the row closer to the second reflector-a first row—can be divided such that a part of it form a first set of sub-sources which are turned on for both the high-beam and low-beam. The rest of this row together with the other, second row then forms a second set of sub-sources which is turned of for low-beam and turned on for high-beam. This provides for a sufficient increase in light intensity and height of the beam when switching from the low-beam to the high-beam. The first row can also be divided into two sets, with the second row forming a third set, wherein choosing which of the first-row sets is on for the low-beam determines whether the cut-off line is for left-hand traffic or right-hand traffic.

It is however also possible to use a single row of sub-sources as the second light source, or use more than two rows.

The second reflector can be planar. This shape can simplify the reflector's manufacture and design. Any other shape of the reflector is however possible, e.g., it can be parabolical or freeform reflector, it can be divided into individually shaped and oriented sections etc. The first reflector can also generally have any shape, e.g., it can have a freeform curved shape designed for providing substantially homogeneous beam of light to the second reflector.

The first light source and the second light source can be carried by a common printed circuit board. This can significantly simplify manufacture and reduce its costs. The printed circuit board is then preferably placed into contact with a heat sink. A common heat sink can also be used even if two separate circuit boards are used for the light sources.

The shortcomings of the solutions known in the prior art are to some extent also eliminated by an optical element for use as the second reflector and the primary lens of the headlight according to invention. The optical element comprises a body from a single piece of transparent material, wherein the body has a reflector portion for forming the second reflector and a lens portion for forming the primary lens, wherein the reflector portion comprises a reflective layer. Another portion for forming the first reflector can also be a part of the body. This element can then be placed in the vicinity of two light sources serving as the first light source and second light source, provided with a projection lens and then it can provide the illumination functions as described above for the headlight.

BRIEF DESCRIPTION OF THE DRAWINGS

A summary of the invention is further described by means of exemplary embodiments thereof, which are described with reference to the accompanying drawings, in which.

DETAILED DESCRIPTION OF THE CURRENT EMBODIMENTS

The invention will be further described by means of exemplary embodiments with reference to the respective drawings.

Figure 1:
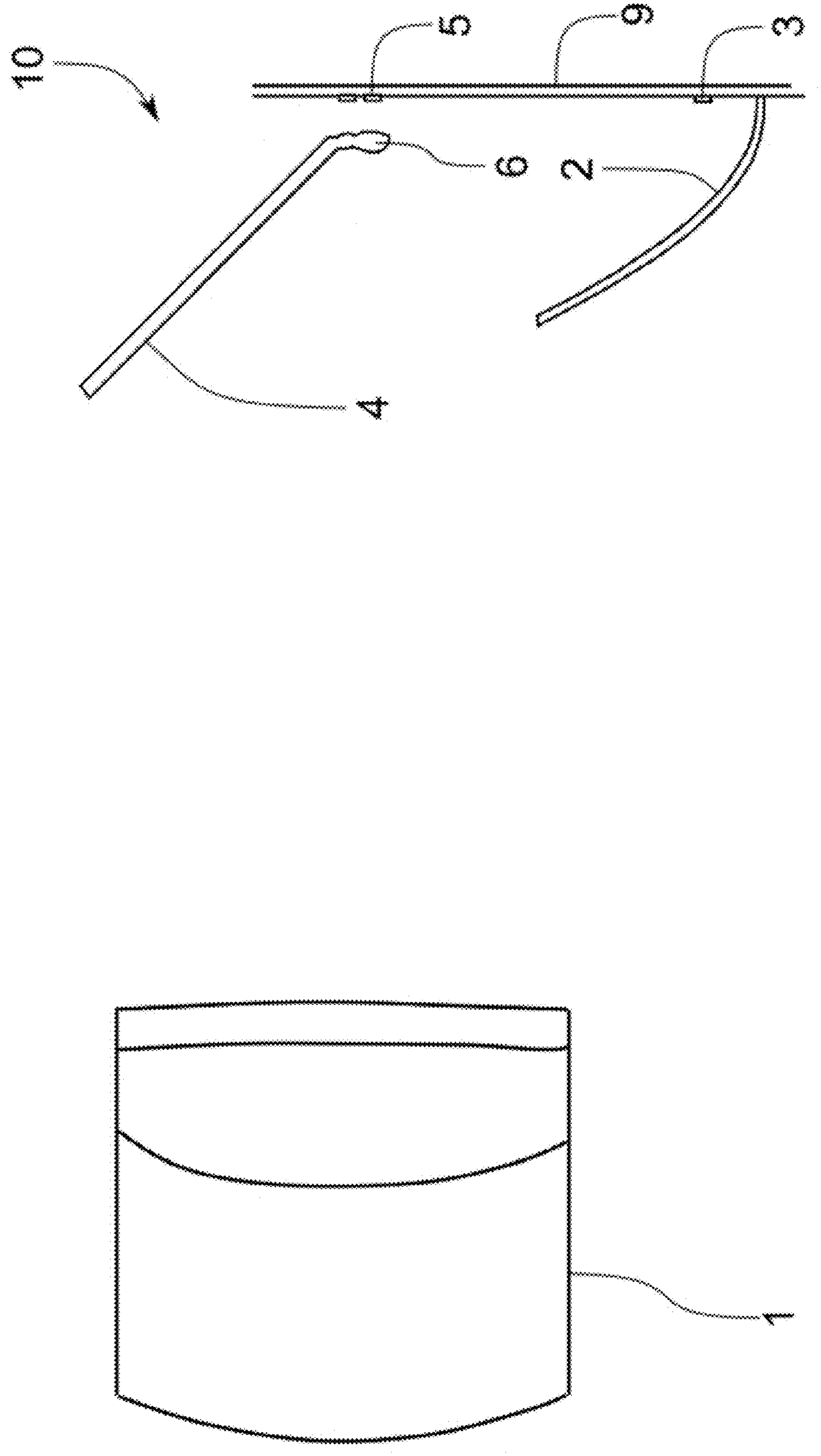
FIG. 1 shows a schematic sideview of optical components of an exemplary embodiment of the headlight according to the invention, wherein a first reflector, a second reflector, a first light source, a second light source, projection lens, primary lens and their mutual arrangement can be seen in this figure.
Figure 2:
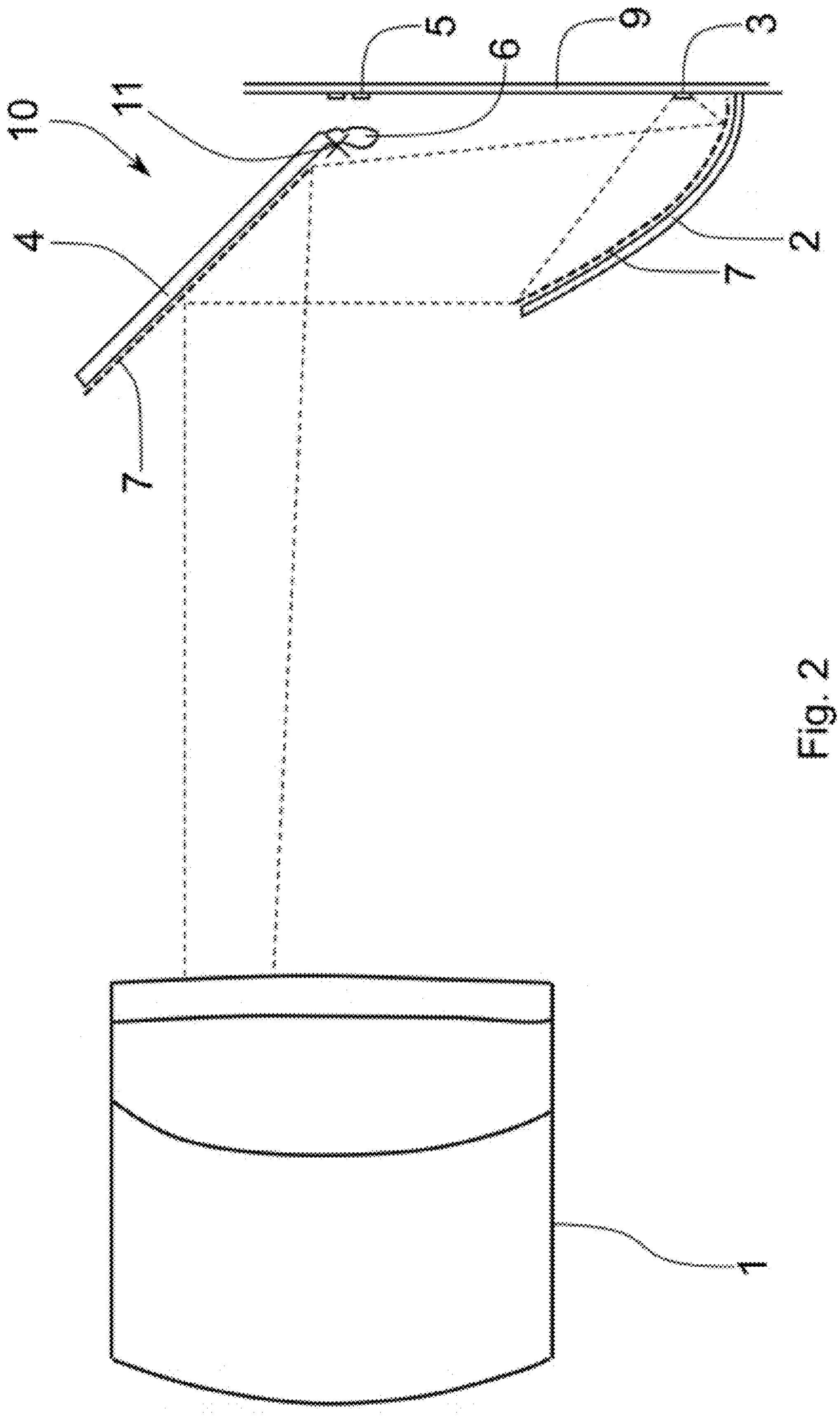
FIG. 2 shows the schematic sideview from FIG. 1 supplemented with indications of several light rays reflected by the reflectors.

An exemplary embodiment of the invention is a headlight for an automobile comprising the optical components as schematically illustrated in FIGS. 1 and 2. This headlight comprises a primary lens 6, secondary projection lens 1, two reflectors and two light sources. Apart from these optical components, the arrangement of which is in the figures, the headlight can also comprise further components. These can include further optical components, such as further lens, reflectors, lightguides, light sources etc., further electrical components, such as actuators, sensors, cabling, etc., or further mechanical components, such as cover lenses, frames, holders or housings, heat sinks, connecting elements (e.g., screws), etc. These further components can be as known from headlights in the state of the art. The headlight is intended to be mounted to the front of an automobile, on both sides. The optical components depicted in the drawings and described in detail below are for providing a low-beam function (with a cut-off line, i.e., asymmetrical beam illuminating the opposite line to a lesser extent such that it does not blind oncoming drivers) and a high-beam function. Further modules, e.g., for turn signals, fog lights etc. can be included in the headlight.

The first light source 3 illuminates the first reflector 2. The reflected light is then reflected again, from the second reflector 4, and then the light passes through the projection lens 1 and out of the headlight to the area in front of the automobile. Two individual light beams from the first light source 3 are depicted in FIG. 2. The first light source 3 is an array of LEDs, e.g., arranged in a row along the width of the first reflector 2. The LEDs are carried by a printed circuit board 9 (PCB) which can be attached to a heat sink (not shown). The first reflector 2 can be fixed to the PCB, it can be carried by a different mechanical component, or it can be made from a single piece of material with other components, as described below in relation to the optical element 10 from FIG. 5.

The first reflector 2 can be for example parabolical, or it can have a freeform shape with individual areas or segments individually designed (shaped and oriented) in order to provide a desired optical function, e.g., homogeneous illumination. The second reflector 4 is for reflecting the light from the first reflector 2 towards the projection lens 1. In the embodiments shown, it is planar. In alternative embodiments, it can be curved, e.g., parabolical, freeform etc. Either of the reflectors, or both of them, can be made from a plastic coated with a reflective layer 7 or coating, e.g., painted, or metalized. Alternatively, they can be directly made from a reflective material. The projection lens 1 can be from glass or from a transparent polymer such as PMMA. It can have spherical surfaces, freeform surfaces, micro-optics segmented surfaces etc. The projection lens 1 is for directing the light from both light sources in desired directions, e.g., to project the cut-off line of the low-beam function in an appropriate distance in front of the automobile.

The primary lens 6 is placed between the second light source 5 and the projection lens 1 such that the light passing through it passes between the first reflector 2 and the second reflector 4. In the embodiment shown, the primary lens 6 is below the second reflector 4 and above the first reflector 2, in some embodiments however, this arrangement can be turned upside down with the second reflector 4 being lower. Preferably, the primary lens 6 is fixed to the second reflector 4 and/or is placed adjacent to it. The second light source 5 is placed behind the primary lens 6 and is directed towards the back surface of the primary lens 6, i.e., the surface or side closer to the occupant area of the vehicle and further from the area in front of the vehicle. The light from the primary lens 6 is then processed by the projection lens 1, together with the light coming from the second reflector 4. Light originating in both the first light source 3 and the second light source 5 then leaves the projection lens 1 as a single low-beam or high-beam beam of light, depending on the state of the second light source 5, as will be explained below.

The projection lens 1 can have its focal point 11 at the primary lens 6 or close to it, e.g., within a tenth of the distance between the focal point 11 and the projection lens 1. This can ensure proper imaging of the light from the primary lens 6 by the projection lens 1.

The second light source 5 is comprised of at least two individually operable sets of sub-sources, e.g., of individual LEDs. The primary lens 6 is accordingly segmented into multiple sections, wherein each of the sub-sources has a corresponding section aligned with the sub-source.

Each of these sections can function to some extent as a separate lens for processing light form a single sub-source of the second light source 5. The shape of the primary lens 6 can be e.g., obtained by a computer simulation and each of the sections can then be shaped and oriented such that the lens provides a substantially homogeneous illumination to an illuminated area of the road. In the embodiment depicted in FIG. 3, each of the sections has a protruding part 8 on both the front surface and the back surface of the primary lens 6. Each protruding part 8 has a so-called pillow shape—it has a curved optical surface that can refract light as it enters or leaves the lens. The use of this segmented optical element helps provide more uniform and homogeneous illumination. Even though each element corresponds to a single sub-source, to some extent neighboring elements also receive light from each given sub-source.

Figure 6:
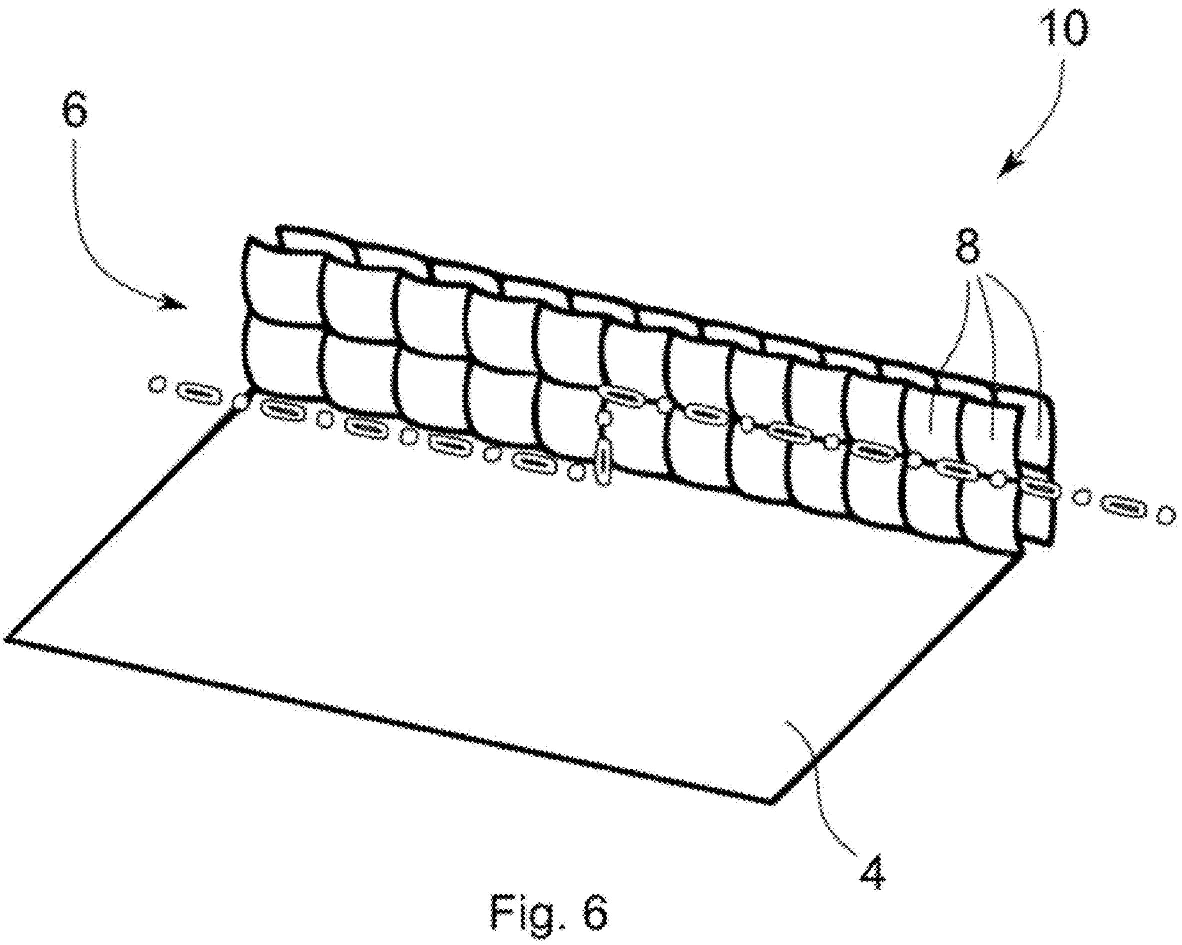
FIG. 6 shows a schematic perspective view of an optical element which forms the first reflector from FIG. 1 including a boundary between primary lens sections.

The second light source 5 has two basic states of operation—in each of these states, the first light source 3 is on as it provides a part of the illumination for both high-beam and low-beam functions. The second light source 5 is divided into the first set of sub-sources and the second set of sub-sources such that the boundary between these sets corresponds to the desired cut-off line for the low-beam function. A corresponding boundary is then also present between the primary lens 6 sections since each section corresponds to and is aligned with its respective sub-source. This boundary is depicted in FIG. 6 by a dash-and-dot line. The first set of sub-sources complements the first light source 3 (light reflected by the second reflector 4) to create the low-beam function. The arrangement of the sub-sources and the shape of the primary lens 6 is thus such that the light from the first set is directed adjacent to the light from the second reflector 4. When the first set of sub-sources is on and the second set of sub-sources is off, while the first light source 3 is also on, the headlight provides the low-beam function.

The second set is then arranged, and its corresponding section are shaped and oriented, such that the light from the second set is adjacent to the light from the first set and from the first reflector 2. When both sets of sub-sources are on, as well as the first light source 3, the high-beam function is provided. The high-beam function does not comprise a cut-off line.

As can be seen in FIG. 1, the primary lens 6 is formed as a part of the second reflector 4. They can for example be injection molded from a transparent polymer, such as polycarbonate or PMMA, and the working surface of the reflector can then be provided with a reflective layer 7, e.g., by a vacuum deposition of metallic layer. The lens-forming part of the piece of material can be protected from the layer-forming process or the layer can be subsequently removed from this part.

The first light source 3 and the second light source 5 can be carried by a common PCB. It is then preferable if they are placed in a single plane with the other optical components arranged accordingly. The first reflector 2, the second reflector 4 with the primary lens 6 and the projection lens 1 can then each be individually attached together, e.g., they can be fixed to a headlight casing or headlight module casing. In some alternative embodiments, the primary lens 6 can be made separately from the second reflector 4 and then fixed to it, e.g., by gluing or welding. In some embodiments, the primary lens 6 can be individually fixed to the PCB, to a casing etc., i.e., it does not necessarily have to be fixed directly to the second reflector 4. It should however be fixed in an appropriate position for providing the high-beam and low-beam function, without any undesired illumination defects, e.g., without causing a substantial boundary between the light from the first light source 3 and the second light source 5 once the light reaches the road.

Figure 3:
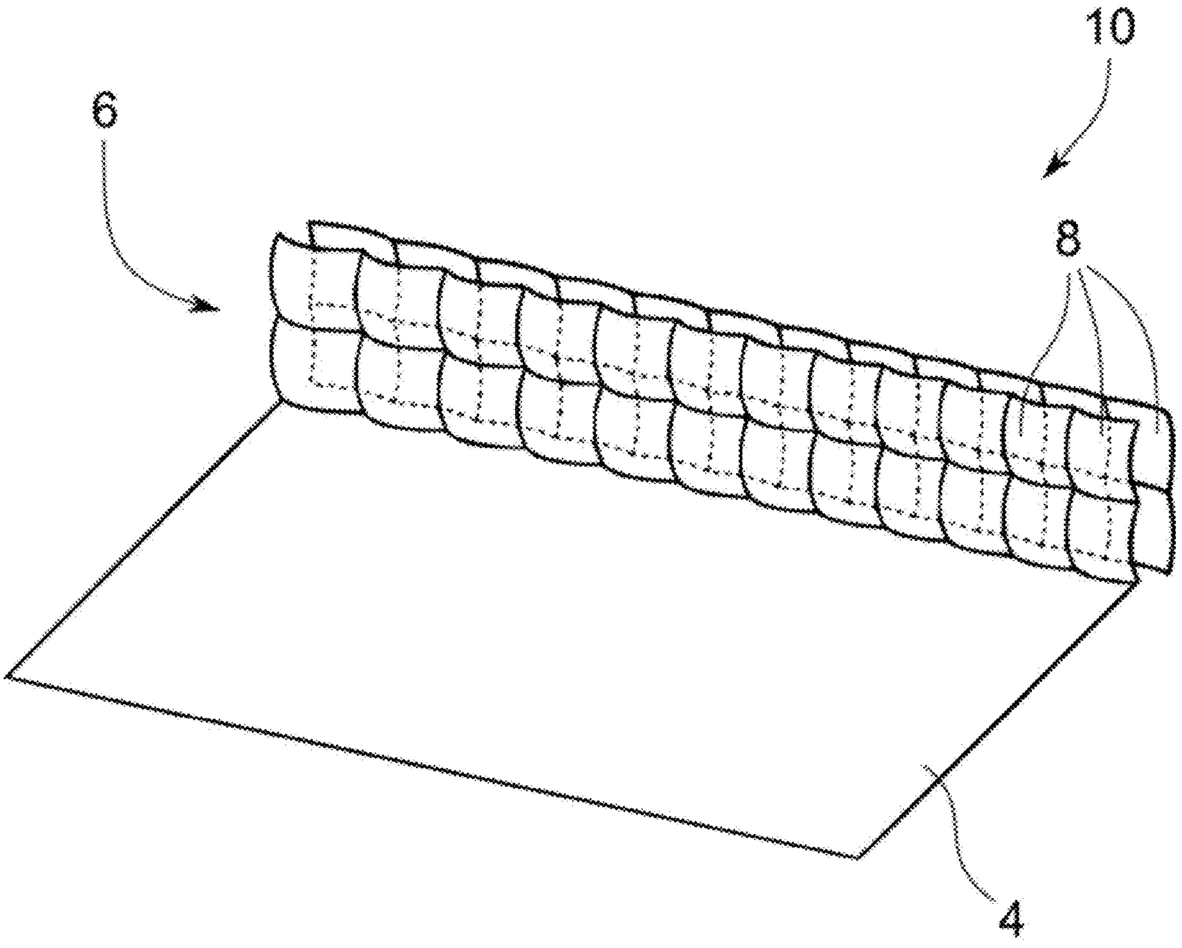
FIG. 3 shows a schematic perspective view of an optical element which forms the first reflector and the primary lens from FIG. 1.

The second light source 5 comprises two rows of LEDs, and thus it comprises two rows of primary lens 6 sections (see FIGS. 3 and 6). The first row of LEDs which corresponds to the row of sections adjacent to the second reflector 4 is divided according to the cut-off line (see FIG. 6). One part of the first row (corresponding to the seven sections on the right side in FIG. 6) forms the first set of sub-sources. The second row together with a part of the first row forms the second set of sub-sources (upper left of FIG. 6).

Figure 4:
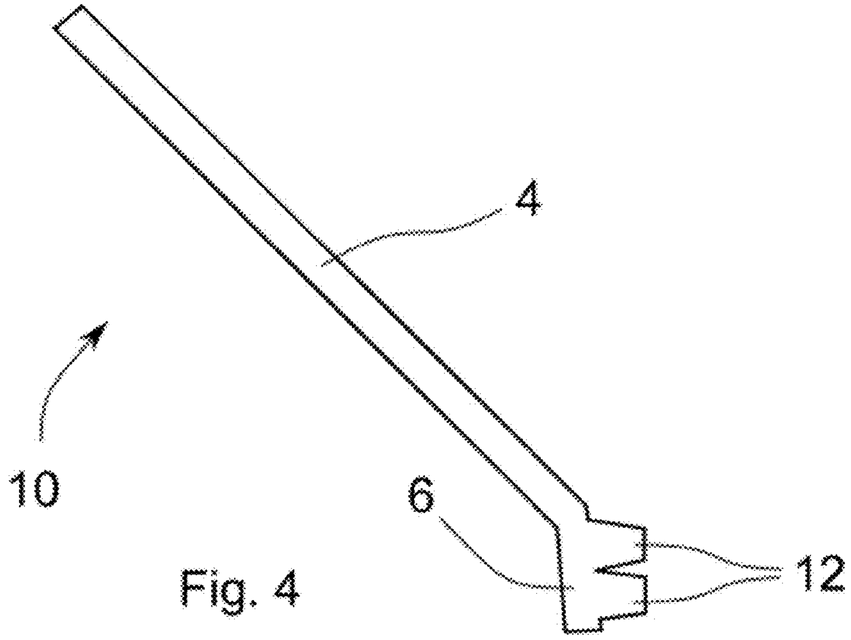
FIG. 4 shows a schematic sideview of an alternative optical element comprising collimating protrusions.

In alternative embodiments, the primary lens 6 can have differently shaped sections. An example of such an embodiment is depicted in FIG. 4. Other features of the headlight can be carried out as described above for the embodiment from FIGS. 1 to 3. In this alternative embodiment, each section is substantially planar on the front surface of the primary lens 6. The back surface has a protruding part 8 for each section, but this part is not pillow-shaped refractive optics. The protruding parts 8 in this embodiment are shaped as collimating protrusions 12 that process the light from each respective sub-source via total internal reflection (TIR). The protruding parts 8 are thus longer so that the TIR can occur. In yet other embodiments, the collimating protrusions 12 can be combined with the pillow-shaped refractive optics on the front surface. In some embodiments, the protruding parts 8 are only placed on the front surface of the primary lens 6. A differently shaped optical surfaces can also be used. For example, each section can be further divided into sub-sections with individually designed shape and orientation.

In further embodiments, the second light source 5 can have a different number of rows. E.g., it can only have a single row of LEDs, which can form both the first and second set of subs-sources. Having at least two rows of LEDs in the second light source 5 is however preferable since it can provide a more precise cut-off line in low-beam as well as sufficient illumination in high-beam. Three rows of LEDs can also be used. The number of rows of sections of the primary lens 6 then corresponds to the number of rows of LEDs.

Figure 5:
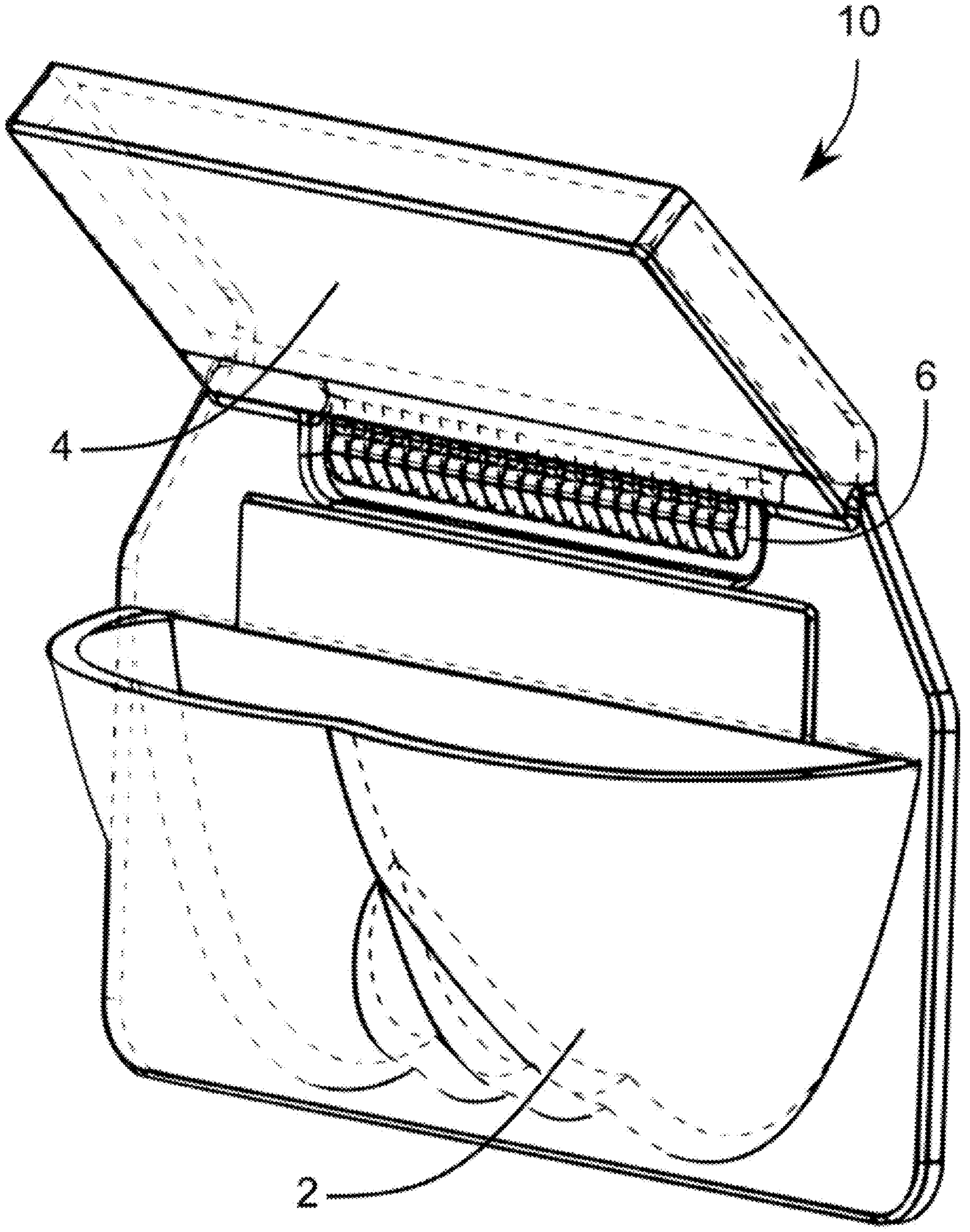
FIG. 5 shows a schematic perspective view of the optical element in another embodiment, wherein this element comprises one piece of material forming both of the reflectors and the primary lens.

Another alternative embodiment is depicted in FIG. 5. The arrangement and functions of the individual components can be carried out as described above, e.g., as depicted in FIG. 1. In this embodiment, however, an optical element 10 is used which contains not only the primary lens 6 and the second reflector 4, but also the first reflector 2. All three of these components are made from a single piece of transparent polymer, e.g., PMMA or polycarbonate. A different transparent material can also be used. Working surfaces of both reflectors are then provided with a reflective layer 7. The optical element 10 can then be connected with a PCB carrying both the first and second light sources 4, 5.

In the depicted embodiment, the optical element 10 comprises a flat body which is connected with an angled flat part forming the second reflector 4. The body comprises cut-out in the area where the light sources are to be placed and comprises a connecting portion between the two cut-outs which increases the element's stability. The first reflector 2 comprises four bulged parts-two larger ones with two smaller ones in between, and is connected to the body around the cut-out for the first light source 3. The primary lens 6 is connected to the second reflector 4 in front of the cut-out for the second light source 5. In other embodiments, the shape of the reflectors and/or the primary lens 6 can be different than depicted, e.g., as described in other above-mentioned embodiments.

In any embodiment, the headlight can comprise a control unit, which ensures switching of the first light source 3 and the second light source 5 with the individual switching (i.e., turning on and off) of all of its sets of sub-sources. I.e., the control unit can be configured—can contain instructions for-turning the first light source 3 and the first set of sub-sources on and the second set off when a low-beam is required, e.g., when the driver presses a certain button on a dashboard. When a high-beam is required, the control unit turns the first light source 3 and the whole second light source 5 on. In some embodiments, this control unit can be an automobile's main control unit. The headlight can thus be a part of an automobile and can be controlled by the automobile's control unit, or it can have its own control unit.

The present invention is also directed to an optical element 10 which can be used in a headlight. An embodiment of this optical element 10 is shown in FIG. 5 and can be used as a part of the headlight according to the invention as described above. The optical element 10 comprises a body from a single piece of transparent material. From this piece, at least a second reflector 4 and a primary lens 6 are formed, wherein the second reflector 4 is further provided with a reflective layer 7.

The second reflector 4 is for reflecting light from a first light source 3 reflected by a first reflector 2 towards a projection lens 1. The primary lens 6 is for receiving light from a second light source 5 and sending it towards the projection lens 1. The primary lens 6 can be formed as an appendage on the second reflector 4. The primary lens 6 processes light from the second light source 5 which is emitted between the two reflectors.

The primary lens 6 has a section with a protruding part 8 for each sub-source of the second light source 5. The sections are divided into two sets, one for providing a low-beam function together with the light reflected by the reflectors, the other for providing a high-beam function together with the light reflected by the reflectors and by the first set.

Preferably, the first reflector 2 is also a part of the body of the optical element 10, as exemplarily depicted in FIG. 5.

LIST OF REFERENCE NUMERALS

1 projection lens
2 first reflector
3 first light source
4 second reflector
5 second light source
6 primary lens
7 reflective layer
8 protruding part
9 printed circuit board
10 optical element
11 focal point
12 collimating protrusion The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A headlight for an automobile comprising:
a projection lens;
a first reflector;
a first light source directed towards the first reflector; and
a second reflector for reflecting light from the first light source reflected by the first reflector towards the projection lens;
wherein the headlight further comprises a second light source directed towards the projection lens, wherein the headlight further comprises a primary lens located between the second light source and the projection lens, wherein the primary lens is located higher than one of the first reflector and second reflector and lower than the other of the first reflector and second reflector, wherein the second light source comprises at least two independently operable sets of sub-sources for creating a high-beam illumination with both the first light source and second light source turned on, and for creating a low-beam illumination comprising a cut-off line for limiting dazzling of oncoming drivers with the first light source turned on and only one of the sets of sub-sources of the second light source turned on.

2. The headlight according to claim 1, wherein the primary lens is adjacent to the second reflector.

3. The headlight according to claim 1, wherein the primary lens is fixed to the second reflector.

4. The headlight according to claim 3, wherein:
the primary lens and the second reflector are from one piece of transparent material; and
a part of the material which forms the second reflector comprises a reflective layer.

5. The headlight according to claim 3, wherein the primary lens, the first reflector, and the second reflector are all from one piece of transparent material.

6. The headlight according to claim 1, wherein the primary lens contains multiple individually shaped sections, each section of the primary lens corresponds to a sub-source of the second light source.

7. The headlight according to claim 6, wherein each section of the primary lens comprises a collimating protrusion for processing light from a sub-source of the second light source via total internal reflection.

8. The headlight according to claim 6, wherein the primary lens comprises a front surface facing towards the projection lens and a back surface facing towards the second light source, wherein on the front surface and/or the back surface, there is for each section a protruding part comprising a refractive optical surface.

9. The headlight according to claim 1, wherein the second light source comprises at least two rows of LEDs.

10. The headlight according to claim 1, wherein the second reflector is planar.

11. The headlight according to claim 1, wherein the first light source and the second light source are carried by a common printed circuit board.

12. An optical element for use as the second reflector and the primary lens of the headlight according to claim 1, wherein the optical element comprises a body from a single piece of transparent material, wherein the body has a reflector portion for forming the second reflector and a lens portion for forming the primary lens, wherein the reflector portion comprises a reflective layer.

* * * * *